(12) United States Patent
Nortio et al.

(10) Patent No.: US 12,098,332 B2
(45) Date of Patent: Sep. 24, 2024

(54) PRODUCTION OF PARAFFINIC PRODUCTS

(71) Applicant: Neste Oyj, Espoo (FI)

(72) Inventors: Jenni Nortio, Porvoo (FI); Kati Sandberg, Porvoo (FI); Väinö Sippola, Porvoo (FI); Virpi Rämö, Porvoo (FI); Jesse Vilja, Porvoo (FI)

(73) Assignee: NESTE OYJ, Espoo (FI)

( * ) Notice: Subject to any disclaimer, the term of this patent is extended or adjusted under 35 U.S.C. 154(b) by 242 days.

(21) Appl. No.: 17/776,931

(22) PCT Filed: Nov. 13, 2020

(86) PCT No.: PCT/FI2020/050756
§ 371 (c)(1),
(2) Date: May 13, 2022

(87) PCT Pub. No.: WO2021/094656
PCT Pub. Date: May 20, 2021

(65) Prior Publication Data
US 2022/0396739 A1 Dec. 15, 2022

(30) Foreign Application Priority Data

Nov. 15, 2019 (WO) .................. PCT/FI2019/050817

(51) Int. Cl.
*C10G 45/58* (2006.01)
*C10G 3/00* (2006.01)
(Continued)

(52) U.S. Cl.
CPC ............. *C10G 45/58* (2013.01); *C10G 3/46* (2013.01); *C10G 3/50* (2013.01); *C10G 3/60* (2013.01);
(Continued)

(58) Field of Classification Search
None
See application file for complete search history.

(56) References Cited

U.S. PATENT DOCUMENTS

| 8,039,682 B2 | 10/2011 | Mccall et al. |
| 8,058,492 B2 | 11/2011 | Anumakonda et al. |

(Continued)

FOREIGN PATENT DOCUMENTS

| BR | PI0908586 A2 | 9/2015 |
| BR | 112019014621 A2 | 4/2020 |

(Continued)

OTHER PUBLICATIONS

Office Action issued on Apr. 3, 2023, by the Brazilian Patent Office in corresponding Brazilian Application No. BR112022008202-9, and an English Translation of the Office Action. (14 pages).

(Continued)

*Primary Examiner* — Tam M Nguyen
(74) *Attorney, Agent, or Firm* — Buchanan Ingersoll & Rooney PC

(57) ABSTRACT

A method for combined production of renewable paraffinic products is disclosed, wherein the method includes providing a renewable paraffinic feed, and fractionating the renewable paraffinic feed into two fractions. Within the two fractions, a lighter fraction fulfils a specification for an aviation fuel component, and a heavier fraction fulfils a specification for an electrotechnical fluid component.

19 Claims, 1 Drawing Sheet

(51) Int. Cl.
*C10G 7/00* (2006.01)
*C10G 67/02* (2006.01)
*C10L 1/08* (2006.01)
*C10M 109/02* (2006.01)

(52) U.S. Cl.
CPC .............. *C10G 7/00* (2013.01); *C10G 67/02* (2013.01); *C10L 1/08* (2013.01); *C10M 109/02* (2013.01); *C10G 2300/1011* (2013.01); *C10G 2300/1014* (2013.01); *C10G 2300/1018* (2013.01); *C10G 2300/202* (2013.01); *C10G 2300/205* (2013.01); *C10G 2300/207* (2013.01); *C10G 2300/208* (2013.01); *C10G 2300/302* (2013.01); *C10G 2300/304* (2013.01); *C10G 2300/307* (2013.01); *C10G 2300/308* (2013.01); *C10G 2300/4006* (2013.01); *C10G 2300/4012* (2013.01); *C10G 2300/4081* (2013.01); *C10G 2300/80* (2013.01); *C10G 2400/04* (2013.01); *C10G 2400/08* (2013.01); *C10G 2400/10* (2013.01); *C10L 2200/0469* (2013.01); *C10L 2270/026* (2013.01); *C10L 2270/04* (2013.01); *C10M 2203/003* (2013.01)

(56) References Cited

U.S. PATENT DOCUMENTS

| | | | |
|---|---|---|---|
| 8,927,795 B2 | 1/2015 | Mccall et al. | |
| 9,321,970 B2 | 4/2016 | Dupassieux et al. | |
| 9,458,396 B2 | 10/2016 | Weiss et al. | |
| 9,469,583 B2 | 10/2016 | Hakola et al. | |
| 9,914,880 B2 | 3/2018 | Fichtl et al. | |
| 10,131,848 B2 | 11/2018 | Aalto et al. | |
| 10,246,658 B2 | 4/2019 | Abhari et al. | |
| 10,351,781 B2 | 7/2019 | Sinha et al. | |
| 10,640,721 B2 | 5/2020 | Sandberg et al. | |
| 10,954,459 B2 | 3/2021 | Kuronen et al. | |
| 11,001,774 B2 | 5/2021 | Abhari et al. | |
| 11,236,280 B2 | 2/2022 | Abhari et al. | |
| 11,306,265 B2 | 4/2022 | Kuronen et al. | |
| 11,459,510 B2* | 10/2022 | Iversen | C10G 3/42 |
| 2009/0250376 A1* | 10/2009 | Brandvold | C10G 69/14 |
| | | | 208/57 |
| 2009/0283442 A1 | 11/2009 | Mccall et al. | |
| 2009/0287029 A1 | 11/2009 | Anumakonda et al. | |
| 2009/0294324 A1* | 12/2009 | Brandvold | C10L 1/06 |
| | | | 208/78 |
| 2009/0301930 A1* | 12/2009 | Brandvold | C10L 1/08 |
| | | | 208/57 |
| 2011/0232169 A1 | 9/2011 | Cherrillo et al. | |
| 2013/0116490 A1 | 5/2013 | Dupassieux et al. | |
| 2013/0305591 A1 | 11/2013 | Mccall et al. | |
| 2014/0291200 A1 | 10/2014 | Weiss et al. | |
| 2015/0011784 A1 | 1/2015 | Aoki et al. | |
| 2015/0094506 A1* | 4/2015 | Fichtl | C10G 65/043 |
| | | | 422/187 |
| 2015/0191404 A1 | 7/2015 | Aalto et al. | |
| 2016/0289568 A1* | 10/2016 | Dutta | C10G 45/58 |
| 2017/0009144 A1 | 1/2017 | Aalto et al. | |
| 2017/0158966 A1 | 6/2017 | Fichtl et al. | |
| 2017/0165655 A1 | 6/2017 | Sinha et al. | |
| 2017/0183593 A1 | 6/2017 | Sandberg et al. | |
| 2017/0327757 A1 | 11/2017 | Abhari et al. | |
| 2018/0148656 A1 | 5/2018 | Laurent et al. | |
| 2018/0216021 A1 | 8/2018 | Kuronen et al. | |
| 2019/0276758 A1 | 9/2019 | Abhari et al. | |
| 2019/0382666 A1 | 12/2019 | Wiklund | |
| 2020/0048522 A1 | 2/2020 | Doucet et al. | |
| 2020/0270544 A1 | 8/2020 | Plancq | |
| 2021/0163835 A1 | 6/2021 | Kuronen et al. | |
| 2021/0261875 A1 | 8/2021 | Abhari et al. | |
| 2022/0033717 A1 | 2/2022 | Kiiski et al. | |
| 2022/0081626 A1* | 3/2022 | Myllyoja | C10G 3/46 |
| 2022/0177791 A1 | 6/2022 | Kuronen et al. | |
| 2022/0403252 A1 | 12/2022 | Vilja et al. | |
| 2022/0411699 A1 | 12/2022 | Rantasalo et al. | |
| 2022/0411702 A1 | 12/2022 | Sarjovaara et al. | |
| 2023/0137687 A1* | 5/2023 | Jadaun | C10G 3/42 |
| | | | 585/240 |

FOREIGN PATENT DOCUMENTS

| | | |
|---|---|---|
| CN | 102027096 A | 4/2011 |
| CN | 102027097 A | 4/2011 |
| CN | 102124080 A | 7/2011 |
| CN | 103122253 A | 5/2013 |
| EP | 1741768 A1 | 1/2007 |
| EP | 1956070 A1 | 8/2008 |
| EP | 2141217 A1 | 1/2010 |
| EP | 1963461 B1 | 5/2018 |
| EP | 3352177 A1 | 7/2018 |
| FI | 960525 A | 8/1997 |
| GB | 692427 A | 6/1953 |
| JP | 2011526640 A | 10/2011 |
| WO | 2009151690 A2 | 12/2009 |
| WO | 2009151692 A2 | 12/2009 |
| WO | 2013115137 A1 | 8/2013 |
| WO | 2014128227 A1 | 8/2014 |
| WO | 2015101837 A2 | 7/2015 |
| WO | 2015142887 A1 | 9/2015 |
| WO | 2018078021 A1 | 5/2018 |
| WO | 2018138412 A1 | 8/2018 |
| WO | 2018139971 A1 | 8/2018 |
| WO | 2019002679 A1 | 1/2019 |
| WO | 2019092379 A2 | 5/2019 |
| WO | 2020109653 A1 | 6/2020 |
| WO | 2021013860 A1 | 1/2021 |
| WO | 2021094655 A1 | 5/2021 |
| WO | 2021094657 A1 | 5/2021 |
| WO | 2021094658 A1 | 5/2021 |

OTHER PUBLICATIONS

Notification of the First Office Action issued on Mar. 11, 2023, by the Chinese Patent Office in corresponding Chinese Patent Application No. 202080078127.9, and an English Translation of the Office Action. (17 pages).
Office Action (Notice of Reasons for Refusal) issued on Jun. 13, 2023, by the Japanese Patent Office in corresponding Japanese Patent Application No. 2022-527229, and an English Translation of the Office Action. (11 pages).
Mohd Noor et al., "Biodiesel as Alternative Fuel for Marine Diesel Engine Applications: A Review", Renewable and Sustainable Energy Reviews, Jun. 9, 2018, pp. 127-142, vol. 94, XP085453841.
The extended European Search Report issued on Dec. 15, 2023, by the European Patent Office in corresponding European Application No. 20886606.1. (9 pages).
The extended European Search Report issued on Dec. 15, 2023, by the European Patent Office in corresponding European Application No. 20886773.9. (10 pages).
International Search Report (PCT/ISA/210) and Written Opinion (PCT/ISA/237) mailed on Feb. 11, 2021, by the Finnish Patent and Registration Office as the International Searching Authority for International Application No. PCT/FI2020/050754. (20 pages).
International Search Report (PCT/ISA/210) and Written Opinion (PCT/ISA/237) mailed on Feb. 17, 2021, by the European Patent Office as the International Searching Authority for International Application No. PCT/FI2020/050756. (11 pages).
International Search Report (PCT/ISA/210) and Written Opinion (PCT/ISA/237) mailed on Feb. 18, 2021, by the Finnish Patent and Registration Office as the International Searching Authority for International Application No. PCT/FI2020/050757. (15 pages).
International Search Report (PCT/ISA/210) and Written Opinion (PCT/ISA/237) mailed on Feb. 15, 2021, by the Finnish Patent and Registration Office as the International Searching Authority for International Application No. PCT/FI2020/050758. (19 pages).

(56) References Cited

OTHER PUBLICATIONS

International Search Report (PCT/ISA/210) mailed on Feb. 19, 2020, by the European Patent Office as the International Searching Authority for International Application No. PCT/FI2019/050817. (12 pages).
Written Opinion of the International Preliminary Examining Authority (PCT/IPEA/408) issued in corresponding International Patent Application No. PCT/FI2020/050754 dated Jan. 13, 2022. (15 pages).
Written Opinion of the International Preliminary Examining Authority (PCT/IPEA/408) issued in corresponding International Patent Application No. PCT/FI2020/050757 dated Dec. 16, 2021. (11 pages).
Written Opinion of the International Preliminary Examining Authority (PCT/IPEA/408) issued in corresponding International Patent Application No. PCT/FI2020/050758 dated Jan. 12, 2022. (15 pages).
International Preliminary Report on Patentability (PCT/IPEA/409) issued in corresponding International Patent Application No. PCT/FI2020/050754 dated Mar. 4, 2022. (37 pages).
International Preliminary Report on Patentability (PCT/IPEA/409) issued in corresponding International Patent Application No. PCT/FI2020/050757 dated Mar. 7, 2022. (29 pages).
International Preliminary Report on Patentability (PCT/IPEA/409) issued in corresponding International Patent Application No. PCT/FI2020/050758 dated Mar. 4, 2022. (41 pages).
Finnish Search Report issued in corresponding Patent Application No. 20185965 dated Mar. 7, 2019. (2 pages).
Chevron, "Diesel Fuels Technical Review", 2007, pp. 1-107, Chevron Corporation. (116 pages).
Dijs, I. J., et al., "Quantitative determination by 14C analysis of the biological component in fuels", Radiocarbon, 2006, vol. 48, Nr. 3, pp. 315-323. (9 pages).
DNV GL, Using biodiesel in marine diesel engines: new fuels, new Challenges, Online Oct. 14, 2020 (retrieved on Jan. 29, 2021, online at www.dnvgl.com/news/using-biodiesel-in-marine-dieselengines-new-fuels-new-challenges-186705. (2 pages).
Neste Retail, Technical Data Sheet, Jun. 14, 2021, https://www.neste.fi/static/datasheet_pdf/150240_fi.pdg. (2 pages).
Ovaska, T. et al., Effects of alternative marine diesel fuels on the exhaust particle size distributions of an off-road diesel engine:, Applied Thermal Engineering, Jan. 28, 2019, vol. 150, pp. 1168-1176. (9 pages).
Repsol, Electra 3x Plus Industr, Lubricants-Technical data sheet; Aug. 1, 2016, XP055666025, retrieved from the Internet URL: https:// www.repsol.com/imagenes/global/en/RP_ELECTRA_3X_PLUS_EN_tcml4-54907.pdf [retrieved on Feb. 6, 2020]. (2 pages).
Starck, L., et al., "Production of Hydroprocessed Esters and Fatty Acids (HEFA)—Optimisation of Process Yield", Oil & Gas Science and Technology Rev. IFP Energies nouvelles, Jun. 23, 2014, vol. 71, No. 1. (13 pages).

\* cited by examiner

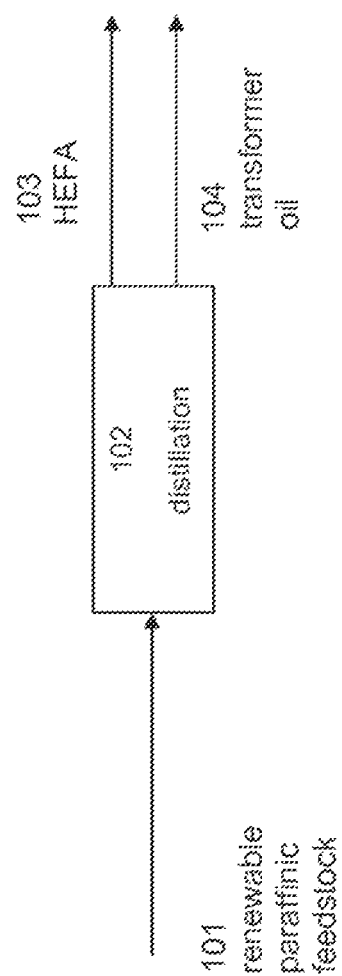

PRODUCTION OF PARAFFINIC PRODUCTS

FIELD OF THE INVENTION

The present invention relates to a method for combined production of two paraffinic products, and more particularly to the paraffinic products obtainable by the method.

BACKGROUND

The following background description art may include insights, discoveries, understandings or disclosures, or associations together with disclosures not known to the relevant art prior to the present invention but provided by the present disclosure. Some such contributions disclosed herein may be specifically pointed out below, whereas other such contributions encompassed by the present disclosure the invention will be apparent from their context.

There is a growing end user demand for sustainable, biosourced and recycled alternatives in the field of aviation fuels and transformer oils. Although not yet mandated to contain biosourced products, there are clear signs of legislative directives emerging also for these areas. Currently, there is limited offering of biosourced alternatives available for the above mentioned applications. Further, the biosourced alternatives are typically not price competitive with the conventional offering, which has limited the development of the biosourced and recycled aviation fuels and transformer oils. There is a need to develop feasible processes in these areas.

In transformer oils segment, there is a clear end user need to develop solutions that offer improved thermal transfer characteristics, which would enable smaller transformer installations. Lower viscosity of the transformer oil would be beneficial to achieve this target. Further, biodegradability of the oil is requested by the end users. Current solutions do not typically meet the criteria of ready biodegradability.

WO2014128227 relates to the use of an electrical equipment comprising electrically insulating fluid containing isoparaffins derived from a renewable carbon source in an electrical equipment. The fluid has a flash point of at least 210° C. and comprises at least 70 wt-% of the isoparaffins.

WO2015142887 relates to biobased base oil dielectric fluids such as isoparaffinic hydrocarbon based fluids derived from hydrocarbon terpenes such as myrcene, ocimene and farnesene. The dielectric fluid or coolant for electrical apparatuses comprises biobased hydrocarbon base oil having a molecular weight greater than 300 g/mol and less than 595 g/mol.

In 2015, transformer oil market size accounted for approximately 2 billion dollars of which 90% was mineral oils (naphthenic or paraffinic), 5% silicone based, and 4% bio-based (renewable) products. The global growth rate of the transformer oil demand was expected to be 9% annually. The share for biobased alternatives was growing at a faster rate of 11% annually. Market estimate from 2016 showed a CAGR (compound annual growth rate) of 8% for transformer oils in total leading to 4 billion USD business by 2023 (Wise Guys).

Aviation fuel market has been forecasted to grow during 2018-2022 at a CAGR of 3.81%. IATA (International air transport association) recognizes the need to address the global challenge of climate change and adopted a set of ambitious targets to mitigate $CO_2$ emissions from air transport. One way to achieve this is by improved technology, including the deployment of sustainable low-carbon fuels.

SUMMARY

The following presents a simplified summary of features disclosed herein to provide a basic understanding of some exemplary aspects of the invention. This summary is not an extensive overview of the invention. It is not intended to identify key/critical elements of the invention or to delineate the scope of the invention. Its sole purpose is to present some concepts disclosed herein in a simplified form as a prelude to a more detailed description.

According to an aspect, there is provided the subject matter of the independent claims. Embodiments are defined in the dependent claims.

One or more examples of implementations are set forth in more detail in the accompanying drawing and the description below. Other features will be apparent from the description and drawing, and from the claims.

BRIEF DESCRIPTION OF THE DRAWINGS

In the following the invention will be described in greater detail by means of preferred embodiments with reference to the attached drawing, in which FIG. 1 illustrates an exemplary process.

DETAILED DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising", "containing" and "including" should be understood as not limiting the described embodiments to consist of only those features that have been mentioned and such embodiments may contain also features/structures that have not been specifically mentioned.

The present invention relates to combined production of two paraffinic hydrocarbon products, an aviation fuel component and an electrotechnical fluid component, by hydrodeoxygenation and isomerization of renewable raw material or feedstock followed by fractionation. The aviation fuel component is preferably a hydroprocessed esters and fatty acids (HEFA) fuel component. The electrotechnical fluid component is preferably a transformer oil component.

The present invention discloses a method for combined production of two paraffinic hydrocarbon products, an aviation fuel component and an electrotechnical fluid component, by hydrodeoxygenation and isomerization of renewable raw material or feedstock followed by fractionating. More specifically, the present invention discloses a method for combined production of renewable paraffinic products, comprising hydrodeoxygenation and isomerization of renewable raw material, followed by fractionating the obtained renewable paraffinic feed by distillation into two fractions, such that within the two fractions, a lighter fraction fulfils a specification for an aviation fuel component, and a heavier fraction fulfils a specification for an electrotechnical fluid. A lighter fraction means that it is a lower boiling range fraction, and the heavier fraction means that it is a higher boiling range fraction. In an embodiment the aviation fuel component is hydroprocessed esters and fatty acids (HEFA) and the electrotechnical fluid component is a transformer oil.

A specification for an aviation fuel component refers to one or more or all specifications of ASTM D7566-17b Annex A2 for HEFA (hydroprocessed esters and fatty acids), such as density (at 15° C.), flash point, freezing point, distillation-10% recovery, distillation-50% recovery, distillation-FBP, distillation-residue, distillation-loss, and/or existent gum, especially at least density (at 15° C.) and freezing point. A specification for an electrotechnical fluid component refers to one or more or all specifications of standard IEC 60296-2018, e.g. Table 2 General Specifications, such as viscosity at 40° C., viscosity at −30° C., pour point, flash point (PM), water content, breakdown voltage, acidity, density at 20° C., and/or interfacial tension, especially at least viscosity at 40° C., viscosity at −30° C., flash point (PM) and acidity.

In preferred embodiments, the renewable paraffinic feed for the fractionation is provided by hydrodeoxygenation and isomerization of renewable raw material comprising fatty acids and/or esters of fatty acids. As a result, a renewable paraffinic feed is obtained wherefrom essentially all oxygen has been removed. Preferably the fatty acids and/or esters of fatty acids include, or are selected from, free fatty acids, fatty acid glycerides such as fatty acid monoglycerides, diglycerides, and/or triglycerides, fatty acid alkyl esters such as esters of fatty acids and C1-C5 alkyl alcohols, particularly methyl, ethyl, propyl, iso-propyl, butyl, and/or sec-butyl esters of fatty acids, and any combinations thereof.

As used herein, renewable or biological or biosourced indicates presence of a material derived from renewable sources. Carbon atoms of renewable or biological origin comprise a higher number of unstable radiocarbon ($^{14}C$) atoms compared to carbon atoms of fossil origin. Therefore, it is possible to distinguish between carbon compounds derived from renewable or biological sources or raw material and carbon compounds derived from fossil sources or raw material by analysing the ratio of $^{12}C$ and $^{14}C$ isotopes. Thus, a particular ratio of said isotopes can be used as a "tag" to identify renewable carbon compounds and differentiate them from non-renewable carbon compounds. The isotope ratio does not change in the course of chemical reactions. Examples of a suitable method for analysing the content of carbon from biological or renewable sources are DIN 51637 (2014), ASTM D6866 (2020) and EN 16640 (2017).

Selection of process conditions (such as higher temperature and/or longer residence time in isomerization to increase yield of the HEFA component) and renewable raw material or feedstock (such as selecting renewable raw material or feedstock providing a high amount of hydrocarbons shorter than or equal to C16 hydrocarbons to increase yield of the HEFA component) may be used in order to obtain the desired yield ratio and technical performance characteristics of the said components.

In an embodiment, the renewable paraffinic feed for the distillation is provided by catalytic hydrotreatment and catalytic isomerization of renewable raw material.

In another embodiment, the hydrotreatment is catalytic hydrodeoxygenation.

The renewable paraffinic feed may be obtained by hydrodeoxygenation and isomerization of renewable (biosourced) raw material. Typically the renewable paraffinic feed thus obtained has a carbon number distribution in the range of C8 to C22 or C10 to C20, preferably in the range of C15 to C18, and distillation range within the range of 140° C.-340° C., preferably within the range of 180° C.-320° C., including a distillation range of 140° C.-340° C. or 180° C.-320° C. The renewable paraffinic feed contains mainly n-paraffins and i-paraffins. The amount of i-paraffins may be adjusted to reach desired characteristics of the product fractions. A renewable aviation fuel component may be produced with the above mentioned process. In a preferred embodiment the aviation fuel component comprises hydroprocessed esters and fatty acids (HEFA). The renewable paraffinic feed is subjected to a distillation step, thus yielding two components. HEFA is obtained as the light distillate. A transformer oil component is obtained as the heavy fraction from the distillation. In some cases the raw material may contain recycled material, such as recycled plastics material.

An embodiment discloses a method for combined production of a renewable aviation fuel component and renewable transformer oil.

In the distillation process, the cloud point and density of the renewable paraffinic feed determines the yield of the distillates. To maximize the yield of the aviation fuel component or more specifically HEFA component, a renewable paraffinic feed with a lower cloud point may be utilized. A typical cloud point of the renewable paraffinic feed may be in the range of −30° C. or below, or in the range of −34° C. or below, without restricting it to that.

The production capacity of transformer oil and HEFA may be adjusted by the selection of process conditions in the renewable paraffinic production process. This makes it possible to provide a cost-efficient and material-efficient way to produce these paraffinic products without or with trace amounts of by-products being produced. For example, less than 2 wt-% or even less than 1 wt-% of byproducts lighter than HEFA or heavier than transformer oil, may be generated. This means that the yield of the two fractions is at least 98 wt-% or at least 99 wt-% calculated from the amount of the renewable paraffinic feed subjected to the fractionation. In certain embodiments the yield of the two fractions may be 100 wt-%.

Shorter chain hydrocarbons enable producing more HEFA and less transformer oil. A lot of transformer oil is produced by using a lot of C17 or longer chain hydrocarbons as the feedstock.

According to an embodiment, a renewable paraffinic feed having a cloud point (CP) of −36° C. and a freezing point (FP) of −32° C. is of vegetable (or biological) origin and further distilled into two cuts: IBP-25% and 25%-FBP, which thus enables obtaining just two products, one (IBP-25%) fulfilling the HEFA specification and one (25%-FBP) fulfilling the standard for the transformer oil, without the need for other processing steps. A yield of the light cut (IBP-25%) fulfilling the HEFA specification of 25 wt-% may be obtained, and a yield of the heavy fraction (25%-FBP) fulfilling the transformer oil specification of 75 wt-% may be obtained.

According to another embodiment, a renewable paraffinic feed having a cloud point (CP) of −48° C. or below, may be distilled into two cuts: IBP-88% and 88%-FBP, which thus enables obtaining two products only, one (IBP-88%) fulfilling the HEFA specification and the other (88%-FBP) fulfilling the standard for the transformer oil, without the need for other processing steps. A yield of the light cut fulfilling the HEFA specification of 88 wt-% may be obtained, and a yield of the heavy fraction fulfilling the transformer oil specification of 12 wt-% may be obtained.

According to another embodiment, a renewable paraffinic feed having a cloud point (CP) of −40° C. or below, may be distilled into two cuts: IBP-77% and 77%-FBP, which thus enables obtaining two products only, one (IBP-77%) fulfilling the HEFA specification and the other (77%-FBP) fulfilling the standard for the transformer oil, without the need for other processing steps.

The cloud point and density of the renewable paraffinic feed determine the yield of the distillates. Typically the cloud point is in the range of −30° C. or below, but is not restricted to that. To maximize the yield of the HEFA component, a renewable paraffinic feed with a lower cloud point and/or freezing point may be utilized.

Fuel compositions boil over a temperature range as opposed to having a single point for a pure compound. The boiling range covers a temperature interval from the initial boiling point, IBP, defined as the temperature at which the first drop of distillation product is obtained, to a final boiling point, FBP, when the highest-boiling compounds evaporate.

ASTM D86 standard "Standard Test Method for Distillation of Petroleum Products and Liquid Fuels at Atmospheric Pressure" and ASTM D7345 standard "Standard Test Method for Distillation of Petroleum Products and Liquid Fuels at Atmospheric Pressure (Micro Distillation Method)" describe a distillation method for measuring the boiling point distribution of liquid fuel products. Using ASTM D86 or ASTM D7345, boiling points are measured at 25 vol-% distilled. The points may also be reported at 88% or 77% distilled.

In an embodiment the IBP-25% distilled product meets the HEFA specification (ASTM D7566-17b, Annex A2) in terms of selected tested physical characteristics, and the 25%-FBP distilled product fulfils the transformer oil standard (IEC 60296-2018) in terms of the tested main physical characteristics.

An embodiment enables the use of the renewable paraffinic production process for combined production of two high value products. It is seen beneficial for the HEFA product to fractionate out the heaviest components from the renewable feed material as later explained, whereas it is needed to remove the light components from transformer oil product to ensure safety in terms of adequate high flash point.

In an embodiment, the production capacity of the transformer oil and HEFA may be adjusted by the selection of the process conditions and feedstock in the renewable paraffinic production process. This makes it possible to find a cost-efficient and material-efficient way for production of these products without any other by-products.

In an embodiment, shorter chain hydrocarbons (such as C8 to C22, C10 to C20, or C15 to C18, hydrocarbons) are used as the renewable paraffinic feed subjected to fractionation compared to existing processes.

In an embodiment, the low temperature performance of the transformer oil and/or the HEFA product may be improved by a higher isoparaffin content of the renewable paraffinic feed.

For certain high end application such as power transmission fluids it may be beneficial to further refine the transformer oil component by a second fractionation step to eliminate trace amount of heavy components or other impurities.

In addition to transformer oil the heavier fraction may be used e.g. as insulating oil, heat transfer media, metal working fluid, electric vehicle (EV) battery coolant, shock absorber fluid or switch gear oil.

Description of the Process

FIG. 1 illustrates an exemplary process. In FIG. 1, a renewable paraffinic feed 101 is subjected to distillation 102 in a distillation column. As a result of the distillation 102 of the renewable paraffinic feed 101, two fractions 103, 104 are obtained from the distillation 102. In the two fractions, the lighter fraction 103 is a distillate fulfilling a specification for hydro-processed esters and fatty acids (HEFA) fuel component, and the heavier fraction 104 (which may be a bottom fraction) fulfils a specification for transformer oil. The HEFA fuel component 103 is obtained during the distillation from an initial boiling point to a 25% distillation point of the renewable paraffinic feed 101, the 25% distillation point being the boiling point measured when 25 vol-% of the renewable paraffinic feed 101 has been distilled. The transformer oil 104 is obtained during distillation from a 25% distillation point to a final boiling point of the renewable paraffinic feed 101, the 25% distillation point being the boiling point measured when 25 vol-% of the renewable paraffinic feed 101 has been distilled. The transformer oil 104 may be the bottom fraction from the distillation 102, or a heavier fraction from the distillation 102. The renewable paraffinic feed 101 is obtained by hydrotreatment and isomerization of renewable raw material.

By the term "hydrotreatment" is meant a catalytic process of organic material by all means of molecular hydrogen. Preferably, hydrotreatment removes oxygen from organic oxygen compounds as water i.e. by hydrodeoxygenation (HDO). Additionally/alternatively hydrotreatment may remove sulphur from organic sulphur compounds as dihydrogen sulphide ($H_2S$), i.e. by hydrodesulphurisation, (HDS), removes nitrogen from organic nitrogen compounds as ammonia ($NH_3$), i.e. by hydrodenitrofication (HDN), and/or removes halogens, for example chlorine, from organic chloride compounds as hydrochloric acid (HCl), i.e. by hydrodechlorination (HDCl).

By the term "hydrodeoxygenation" (HDO) e.g. of triglycerides or other fatty acid derivatives or fatty acids is meant the removal of carboxyl oxygen as water by means of molecular hydrogen under the influence of a catalyst. The hydrodeoxygenation may be accompanied by hydrodesulphurisation, hydrodenitrification, and/or hydrodechlorination reactions, as explained above.

Reaction conditions and catalysts typically used in the hydrodeoxygenation of biological material and in the isomerization of resultant n-paraffins are known techniques. Examples of such processes are presented in FI100248, Examples 1-3, and in WO 2015/101837 A2.

By the term "deoxygenation" is meant removal of oxygen from organic molecules, such as fatty acid derivatives, alcohols, ketones, aldehydes and/or ethers, by any means previously described, or decarboxylation or decarbonylation.

Renewable Raw Material

Renewable raw material (or renewable oil and/or fat) refers to a feedstock derived from a biological raw material component containing oils and/or fats, usually containing lipids (e.g. fatty acids or glycerides), such as plant oil/fats, vegetable oil/fats, animal oil/fats, algae oil/fats, fish oil/fats and algae oil/fats, or oil/fats from other microbial processes, for example, genetically manipulated algae oil/fats, genetically manipulated oil/fats from other microbial processes and also genetically manipulated vegetable oil/fats. Components of such materials may also be used, for example, alkyl esters (typically C1-C5 alkyl esters, such as methyl, ethyl, propyl, iso-propyl, butyl, sec-butyl esters) or olefins. Renewable specifically excludes fossil sources, however recycled fossil material may be utilized.

The renewable oils and/or fats may include a single kind of oil, a single kind of fat, mixtures of different oils, mixtures of different fats, mixtures of oil(s) and fat(s), fatty acids, glycerol, and/or mixtures of the afore-mentioned.

These oils and/or fats typically comprise C10-C24 fatty acids and derivatives thereof, including esters of fatty acids, such as glycerides, i.e. glycerol esters of fatty acids. The glycerides may specifically include monoglycerides, diglycerides and triglycerides. Preferably the renewable raw material comprises C10-C24 fatty acids and/or esters of fatty acids. For example, the renewable raw material may comprise at least 50 weight-%, preferably at least 70 weight-%, more preferably at least 80 weight-%, or at least 90 weight-%, or at least 95 weight-%, of C10-C24 fatty acids and/or esters of fatty acids.

Renewable Paraffinic Feed and Preparation Thereof

The preparation of a renewable paraffinic feed often involves reactions removing oxygen from the renewable raw material or feedstock, and there are a number of strategies for carrying out this. The deoxygenation may comprise one or more of following reactions:

1) hydrodeoxygenation (HDO), hydrogenation of oxygen bonds—removing oxygen as $H_2O$,
2) decarboxylation where oxygen is removed in the form of $CO_2$, and
3) decarbonylation where oxygen is removed in the form of CO.

Process conditions for hydrodeoxygenation are known in the art. For example, the hydrodeoxygenation of renewable raw material may be carried out on a metal sulphide catalyst. The metal may be one or more Group VI metals, such as Mo or W, or one or more Group VIII non-noble metals such as Co or Ni. The catalyst may be supported on any convenient support, such as alumina, silica, zirconia, titania, amorphous carbon, molecular sieves or combinations thereof. Usually the metal is impregnated or deposited on the support as metal oxides. They are then typically converted into their sulphides. Examples of typical catalysts for hydrodeoxygenation are molybdenum containing catalysts, NiMo, CoMo, or NiW catalysts, supported on alumina or silica, but many other hydrodeoxygenation catalysts are known in the art, and have been described together with or compared to NiMo and/or CoMo catalysts. The hydrodeoxygenation is preferably carried out under the influence of sulphided NiMo or sulphided CoMo catalysts in the presence of hydrogen gas.

The hydrodeoxygenation may be performed under a hydrogen pressure from 10 to 200 barg (bar gauge), at temperatures from 200 to 400° C., and liquid hourly space velocities of 0.2 h-1 to 10 h-1. During a hydrodeoxygenation step using a sulfided catalyst, the sulfided state of the catalyst may be maintained by the addition of sulphur in the gas phase or by using a feedstock having sulphur containing mineral oil blended with the renewable raw material or feedstock. The sulphur content of the total feed being subjected to hydrodeoxygenation may be, for example, in the range of 50 wppm (ppm by weight) to 20 000 wppm, preferably in the range of 100 wppm to 1000 wppm.

Effective conditions for hydrodeoxygenation may reduce the oxygen content of the renewable raw material or feedstock to less than 1 wt-%, such as less than 0.5 wt-% or less than 0.2 wt-%. In some cases, the conditions may be selected to yield partial hydrodeoxygenation corresponding to a deoxygenation of at least 40 wt-%, at least 50 wt-% or at least 75 wt-%.

The renewable paraffinic feed of the present invention may be provided by isomerizing a hydrotreated renewable raw material obtained from the renewable raw material. Generally, the renewable paraffinic feed may be produced from the renewable raw material using any known method. Specific examples of a method for producing the renewable paraffinic feed are provided in the European patent application EP 1741768 A1. Also other methods may be employed, particularly another BTL method may be chosen, for example biomass gasification followed by a Fischer-Tropsch method.

In a preferred embodiment, preparing a renewable paraffinic feed from a renewable raw material comprises subjecting the renewable raw material to a deoxygenation treatment. Most renewable raw material comprises materials having a high oxygen content. In an embodiment, the renewable raw material or feedstock comprises fatty acids, or fatty acid derivatives, such as triglycerides, or a combination thereof.

In the present invention, the deoxygenating method is not particularly limited and any suitable method may be employed. Suitable methods are, for example, hydrotreating, such as hydrodeoxygenation (HDO), catalytic hydrodeoxygenation (catalytic HDO), catalytic cracking (CC), or a combination thereof. Other suitable methods include decarboxylation and decarbonylation reactions, either alone or in combination with hydrotreating.

In a preferred embodiment, the deoxygenation treatment, to which the renewable raw material is subjected, is hydrotreatment. Preferably, the renewable raw material is subjected to hydrodeoxygenation (HDO) which preferably uses a HDO catalyst. Catalytic HDO is the most common way of removing oxygen and has been extensively studied and optimized. However, the present invention is not limited thereto. As the HDO catalyst, a HDO catalyst comprising hydrogenation metal supported on a carrier may be used. Examples include a HDO catalyst comprising a hydrogenation metal selected from a group consisting of Pd, Pt, Ni, Co, Mo, Ru, Rh, W or a combination of these. Alumina or silica is suited as a carrier, among others. The hydrodeoxygenation step may, for example, be conducted at a temperature of 100-500° C. and at a pressure of 10-150 bar (absolute).

Preparing a hydrotreated raw material from the renewable raw material may comprise a step of hydrocracking hydrocarbons in the renewable hydrocarbon raw material. Thus, the chain length of the renewable hydrocarbon raw material may be adjusted and the product distribution of the produced mixture of biohydrocarbons can be indirectly controlled.

Isomerisation Treatment

The renewable paraffinic feed of the present invention may be provided by subjecting at least straight chain hydrocarbons in the hydrotreated raw material to an isomerization treatment to prepare the renewable paraffinic feed. The renewable paraffinic feed and its preparation is described above.

The isomerization treatment causes branching of hydrocarbon chains, i.e. isomerization, of the hydrotreated raw material. Branching of hydrocarbon chains improves cold properties, i.e. the isomeric composition formed by the isomerization treatment has better cold properties compared to the hydrotreated raw material. Better cold properties refers to a lower temperature value of a pour point. The isomeric hydrocarbons, or isoparaffins, formed by the isomerization treatment may have one or more side chains, or branches.

The isomerization step may be carried out in the presence of an isomerization catalyst, and optionally in the presence of hydrogen added to the isomerisation process. Suitable isomerisation catalysts contain a molecular sieve and/or a metal selected from Group VIII of the periodic table and optionally a carrier. Preferably, the isomerization catalyst contains SAPO-11, or SAPO-41, or ZSM-22, or ZSM-23, or fernerite, and Pt, Pd, or Ni, and $Al_2O_3$, or $SiO_2$. Typical isomerization catalysts are, for example, Pt/SAPO-11/$Al_2O_3$, Pt/ZSM-22/$Al_2O_3$, Pt/ZSM-23/$Al_2O_3$, and Pt/SAPO-11/$SiO_2$. The catalysts may be used alone or in combination. The presence of added hydrogen is particularly preferable to reduce catalyst deactivation. In a preferred embodiment, the isomerization catalyst is a noble metal bifunctional catalyst, such as Pt-SAPO and/or Pt-ZSM-catalyst, which is used in combination with hydrogen. The isomerization step may, for example, be conducted at a temperature of 200-500° C., preferably 280-400° C., and at a pressure of 10-150 bar, preferably 30-100 bar (absolute). The isomerization step may comprise further intermediate steps such as a purification step and a fractionation step. The isomerization may be performed e.g. at 300° C. to 350° C.

Incidentally, the isomerization treatment is a step which predominantly serves to isomerize the hydrotreated raw material. That is, while most thermal or catalytic conversions (such as HDO) result in a minor degree of isomerization (usually less than 5 wt-%), the isomerization step which may be employed in the present invention is a step which leads to a significant increase in the content of isoparaffins.

Thus the renewable raw material may be subjected at least to a hydrodeoxygenation reaction in the presence of hydrogen and a hydrodeoxygenation catalyst and to an isomerisation reaction in the presence of an isomerisation catalyst, for obtaining the renewable paraffinic feed. When a hydrodeoxygenation step and an isomerisation step are applied, these may be performed either simultaneously or in sequence. The hydrodeoxygenation reaction may be performed in the presence of hydrogen gas and a hydrodeoxygenation catalyst, such as CoMo, NiMo, NiW, CoNiMo on a support, for example, an alumina support, zeolite support, or a mixed support. The hydrodeoxygenation reaction may, for example, be conducted at a temperature in the range from 250 to 400° C., and at a pressure in the range from 20 to 80 barg, at a WHSV (weight hourly space velocity, i.e. mass flow/catalyst mass) in the range from 0.5 to 3 h-1, and a $H_2$/oil ratio of 350-900 nl/l, using a catalyst, such as NiMo, optionally on a alumina support.

The product of the hydrodeoxygenation step, i.e. the hydrotreated renewable raw material, may be subjected to an isomerization step in the presence of hydrogen and an isomerization catalyst. The isomerisation catalyst may be a noble metal bifunctional catalyst such as Pt-SAPO or Pt-ZSM catalyst or NiW. The isomerization reaction may, for example, be conducted at a temperature of 250-400° C. and at a pressure of 10-60 barg. The isomerisation reaction may, for example, be conducted at a temperature of 250-400° C., at a pressure of between 10 and 60 barg, at a WHSV of 0.5-3 h-1, and at a $H_2$/oil ratio of 100-800 nl/l.

The hydrodeoxygenation and hydroisomerisation steps may be carried out in a single step on the same catalyst bed using a single catalyst for this combined step, e.g. NiW, or a Pt catalyst, such as Pt/SAPO in a mixture with a Mo catalyst on a support, e.g. NiMo on alumina.

The hydrotreatment step and the isomerization step may be conducted in the same reactor. Alternatively, hydrotreatment step and the isomerization step may be conducted in separate reactors.

The low temperature performance of the aviation fuel component and/or the electrotechnical fluid component may be improved by having a high isoparaffin content of the renewable paraffinic feed through adjusting the isomerization. The isomerization temperature may be selected from the higher end of the temperature range, such as from 330° C. to 340° C., whereby cracking tendency is enhanced.

Moreover, the density and the flash point of the obtained components may be decreased by increasing the reflux rate of lighter components after isomerization. The liquid effluent from the isomerization may be directed to stabilization in a stabilization column preferably at a lowered pressure compared to isomerization, to obtain a stabilized renewable paraffinic feed and an overhead fraction comprising hydrocarbons in the naphtha range (C4-C8). The stabilized renewable paraffinic feed is then subjected to the fractionation. The overhead fraction from the stabilization may be recovered and used as a gasoline component, or preferably, at least part of the overhead fraction may be recycled back to the stabilization column for refluxing. Thus, preferably according to the present invention the renewable paraffinic feed is subjected, after hydrodeoxygenation and isomerization, to a stabilization treatment in a stabilization column, at a pressure lower than the isomerization pressure. The recycled amount of the hydrocarbons in the naphtha range used for refluxing may be from 80 wt-% or more, preferably 90 wt-% or more, such as from 90 to 95 weight-%, of the formed hydrocarbons in the naphtha range at the stabilization column overhead. A high recycle amount aids in the subsequent separation of the lighter and heavier fractions, and increases the yields of the obtained aviation fuel and electrotechnical fluid components. Naturally, a higher refluxing requires adjustment of the equipment for higher flow. Thus, preferably according to the present invention during stabilization an overhead fraction comprising hydrocarbons in the naphtha range (C4-C8) is obtained, and an amount of 80 wt-% or more, preferably 90 wt-% or more, such as from 90 to 95 weight-%, of the formed hydrocarbons in the naphtha range at the stabilization column overhead is recycled back to the stabilization column for refluxing.

In an embodiment a transformer oil is disclosed, which is produced from renewable paraffinic feed using hydrotreated and isomerised renewable paraffinic feed as feedstock. The transformer oil has viscosity at 40° C. as measured according to ISO 3104-1996 of 12 $mm^2$/s or below, typically 3.4 $mm^2$/s, viscosity at -30° C. as measured according to ISO 3104-1996 of 1800 $mm^2$/s or below, typically 42.2 $mm^2$/s, a flash point (PM) as measured according to ISO 2719-2016 of at least 135° C., typically 138.5° C., and acidity of 0.01 mg KOH/g or below, typically less than 0.001 mg KOH/g. The transformer oil may be obtained by the combined production method disclosed above. However, the use of the combined production method is not mandatory, instead the transformer oil may be produced by some other transformer oil production method.

The method for combined production of renewable paraffinic products, comprises providing a renewable paraffinic feed by hydrodeoxygenation and isomerization of renewable raw material comprising fatty acids and/or esters of fatty acids, and fractionating the renewable paraffinic feed into two fractions. Within the two fractions, a lighter fraction fulfils a specification for an aviation fuel component of ASTM D7566-17b Annex A2 for HEFA (hydroprocessed esters and fatty acids), and a heavier fraction fulfils a specification for an electrotechnical fluid component of standard IEC 60296-2018. A combined yield of the two fractions is at least 98 wt-% of the renewable paraffinic feed subjected to the fractionation, and a yield of the lighter fraction is 20-90 wt-% of the total weight of the two fractions, and a yield of the heavier fraction is 10-80 wt-% of the total weight of the two fractions.

In an embodiment, the lighter fraction fulfils a specification for an aviation fuel component of ASTM D7566-17b Annex A2 for HEFA comprising a density of at most 772 kg/m³, preferably 730-772 kg/m³, as measured at 15° C. according to ASTM D4052-2016, and a freezing point of less than −40° C. as measured according to IP529-2016.

In an embodiment, the lighter fraction is an aviation fuel component fulfilling all specifications of ASTM D7566-17b Annex A2 for hydroprocessed esters and fatty acids (HEFA).

In an embodiment, the heavier fraction fulfils a specification for an electrotechnical fluid component of standard IEC 60296-2018 comprising a viscosity at 40° C. as measured according to ENISO 3104-1996 of 12 mm²/s or below, typically 3.4 mm²/s; a viscosity at −30° C. as measured according to ENISO 3104-1996 of 1800 mm²/s or below, typically 42.2 mm²/s; a flash point (PM) as measured according to ENISO 2719-2016 of at least 135° C., typically 138.5° C.; and an acidity of 0.01 mg KOH/g or below, typically less than 0.001 mg KOH/g.

In an embodiment, the heavier fraction is a transformer oil fulfilling all Table 2 General Specifications of standard IEC 60296-2018.

In an embodiment, the fractionating is provided by distillation.

In an embodiment, a combined yield of the two fractions is at least 99 wt-% or 100 wt-% of the renewable paraffinic feed subjected to the fractionation.

In an embodiment, the isomerization is catalytic isomerization, preferably catalytic hydroisomerization.

In an embodiment, the production capacity of the lighter fraction and the production capacity of the heavier fraction are adjusted by selection of the hydrodeoxygenation and isomerization conditions, such as temperature and/or residence time in isomerization, and/or by selection of the renewable raw material.

In an embodiment, the production capacity of the lighter fraction and the production capacity of the heavier fraction are adjusted by selection of the cloud point and/or the density of the renewable paraffinic feed.

In an embodiment, the hydrodeoxygenation is performed under a hydrogen pressure from 10 to 200 barg (bar gauge), at temperature from 200 to 400° C., and using liquid hourly space velocity of 0.2 h-1 to 10 h-1.

In an embodiment, the isomerization is performed at a temperature of 200-500° C., preferably at 280-400° C., and at a pressure of 10-150 bar (absolute), preferably 30-100 bar.

In an embodiment, the renewable paraffinic feed is subjected, after hydrodeoxygenation and isomerization, to a stabilization treatment in a stabilization column, at a pressure lower than the isomerization pressure, to obtain a stabilized renewable paraffinic feed and an overhead fraction comprising hydrocarbons in the naphtha range (C4-C8), followed by subjecting the stabilized renewable paraffinic feed to the fractionation, and optionally recovering and recycling at least part of the overhead fraction back to the stabilization column for refluxing. Preferably, an amount of 80 wt-% or more, preferably 90 wt-% or more, such as from 90 to 95 weight-%, of the formed hydrocarbons in the naphtha range at the stabilization column overhead is recycled back to the stabilization column for refluxing.

In an embodiment, the cloud point of the renewable paraffinic feed is −30° C. or below, −34° C. or below, −40° C. or below, or −48° C. or below, as measured according to EN23015-1994.

In an embodiment, a yield of the lighter fraction is 70-90 wt-% of the total weight of the two fractions, and a yield of the heavier fraction is 10-30 wt-% of the total weight of the two fractions.

In an embodiment, the renewable paraffinic feed contains C8-C22 hydrocarbons, C10-C20 hydrocarbons, or C15-C18 hydrocarbons.

In an embodiment, the renewable paraffinic feed has a distillation range within the range of 140° C.-340° C., preferably within the range 180° C.-320° C., including a distillation range of 140° C.-340° C. or 180° C.-320° C.

In an embodiment, the lighter fraction is stabilized by admixing one or more antioxidants.

In an embodiment, 1-50 vol-%, preferably 3-50 vol-%, of the lighter fraction; 99-50 vol-%, preferably 97-50 vol-%, of a fossil aviation fuel component; and optionally one or more aviation fuel performance enhancing additive selected from antioxidants, metal deactivators, and fuel system icing inhibitors, and/or one or more aviation fuel handling and maintenance additive selected from electrical conductivity improvers, leak detection additives, biocidal additives, corrosion inhibitors, and lubricity improvers; are blended to obtain a final aviation fuel composition.

Example 1

Renewable paraffinic product produced by hydrodeoxygenation and isomerization of renewable raw material or feedstock of vegetable origin and having a cloud point of −36° C. and a freezing point of −32° C. was distilled into two cuts: IBP-25% and 25%-FBP, thus obtaining (only) two products, one fulfilling the HEFA specification and one fulfilling the standard for the transformer oil, without performing further processing steps.

The distillation was performed by laboratory scale batch distillation by using a 15 liters batch. Accurate yields from the distillation were
initial boiling point to 25% distillation point: 25 wt-%,
25% distillation point to final boiling point: 75 wt-%.

In Table 1, the distillation results 25%-FBP refer to key parameters defining the usability of the distilled product in transformer oils as defined in the IEC 60296-2018 standard (Fluids for electrotechnical applications—unused mineral insulating oils for transformers and switchgear). The product 25%-FBP fulfilled the transformer oil standard (IEC 60296-2018) in terms of the tested main physical characteristics as reported in Table 1. Regarding the interfacial tension, it is stated in the IEC 60296-2018 that where it is used as a general requirement, a limit of minimum 40 mN/m is recommended. Also this requirement is fulfilled as shown in Table 1.

TABLE 1

| Standard | Method | Unit | Product 25%-FBP Result | Standard IEC 60296 - 2018 Limit |
| --- | --- | --- | --- | --- |
| ISO 3104 - 1996 | Viscosity 40° C. | mm²/s | 3.4 | Max 12 |
| ISO 3104 - 1996 | Viscosity −30° C. | mm²/s | 42.2 | Max 1800 |
| ISO 3016 | Pour point | ° C. | <−55 | Max −40 |
| ENISO 2719 - 2016 | Flash point - PM | ° C. | 139 | Min 135 |
| IEC 60814 | Water content | mg/kg | 25 (ENISO12937) | Max 30 (for bulk supply) |
| IEC 60156 | Breakdown voltage | kV | 73 | Min 30 |
| IEC 62021-1 | Acidity | mg KOH/g | <0.001 (ASTM D3242) | Max 0.01 |

TABLE 1-continued

| Standard | Method | Unit | Product 25%-FBP Result | Standard IEC 60296 - 2018 Limit |
|---|---|---|---|---|
| ISO 12185 | Density at 20° C. | g/ml | 0.780 | Max 0.895 |
| ASTM D971M | Interfacial tension | mN/m | 45 | No general requirement |

The results shown in Table 2 demonstrate that the IBP-25% distilled product met the HEFA specification (ASTM D7566-17b, Annex A2) in terms of the selected tested physical characteristics as reported in Table 2. Density requirement of at most 772 kg/m$^3$ (measured at 15° C. according to ASTM D4052-2016) was achieved with the performed distillation (density of the feed was 779 kg/m$^3$ measured at 15° C. according to ASTM D4052-2016). Freezing point of below −40° C. was achieved. In Table 2, the distillation results for IBP-25% refer to key parameters defining the usability of the distilled product as aviation fuel component as defined in ASTM D7566-17b, Annex A2.

TABLE 2

| Standard | Method | Unit | IBP-25% |
|---|---|---|---|
| ASTM D4052 - 2016 | Density (at 15° C.) | kg/m$^3$ | 768.9 |
| IP170 | Flash point | ° C. | 65 |
| IP529 - 2016 | Freezing point | ° C. | −53.2 |
| ASTM D7345 ASTM D86 | Distillation-IBP | ° C. | 177.4 |
| ASTM D7345 ASTM D86 | Distillation-10% recovery | ° C. | 203.8 |
| ASTM D7345 ASTM D86 | Distillation-50% recovery | ° C. | 251.6 |
| ASTM D7345 ASTM D86 | Distillation-FBP | ° C. | 267.7 |
| ASTM D7345 ASTM D86 | Distillation-residue | vol-% | 1.4 |
| ASTM D7345 ASTM D86 | Distillation-loss | vol-% | 0.4 |
| IP540 | Existent gum | mg/100 ml | 1 |

Considering the light distillate aimed for aviation fuel, the density requirement of at most 772 kg/m$^3$ (measured at 15° C. according to ASTM D4052 2016) was achieved with the performed distillation (density of the renewable paraffinic feed was 779 kg/m$^3$ measured at 15° C. according to ASTM D4052-2016).

The freezing point of below −40° C. was achieved.

Example 2

A highly isomerized renewable paraffinic product produced by hydrodeoxygenation and isomerization of renewable raw material or feedstock of vegetable origin and having a cloud point of −40° C. was distilled into two cuts: one fulfilling the HEFA specification and one fulfilling the standard for the transformer oil.

The distillation was performed by laboratory scale batch distillation by using a 15 liters batch where a highly isomerized batch was distilled to two fractions IBP-77% and 77%-FBP representing the two desired products. The fractionation was performed with a thin film evaporator.

Results of the selected tested physical characteristics vs. the transformer oil standard (IEC 60296-2018) are presented in Table 3.

The high isomerization degree of the starting material enabled the heavy distillate to have a cloud point that is considerably lower than −30° C. which is set by the standard in order to be able to detect the viscosity at −30° C. Thus, the cold start performance of the product was improved.

TABLE 3

| Standard | Method | Unit | Product 77%-FBP Result | Standard IEC 60296 - 2018 Limit |
|---|---|---|---|---|
| ENISO 3104 - 1996 | Viscosity 40° C. | mm$^2$/s | 3.4 | Max 12 |
| ENISO 3104 - 1996 | Viscosity −30° C. | mm$^2$/s | 44.3 | Max 1800 |
| EN23015 - 1994 | Cloud point | ° C. | −36 | — |
| ISO 3016 | Pour point | ° C. | −57 (ASTMD5950) | Max −40 |
| IEC 60814 | Water content | mg/kg | 11 (ENISO 12937) | Max 30 |
| ISO 12185 | Density at 20° C. | g/ml | 0.785 | Max 0.895 |

The results shown in Table 4 demonstrate that the IBP-77% distilled product met the HEFA specification (ASTM D7566-17b, Annex A2) in terms of the selected tested physical characteristics as reported in Table 4. Density requirement of at most 772 kg/m$^3$ (measured at 15° C. according to ASTM D4052-2016) was achieved with the performed distillation (density of feed was 779 kg/m$^3$ measured at 15° C. according to ASTM D4052-2016). Freezing point of below −40° C. was achieved. In Table 4, the distillation results for IBP-77% refer to key parameters defining the usability of the distilled product as aviation fuel component as defined in ASTM D7566-17b, Annex 2.

TABLE 4

| Standard | Method | Unit | IBP-77% |
|---|---|---|---|
| ASTM D4052 - 2016 | Density (at 15° C.) | kg/m$^3$ | 770.3 |
| IP170 | Flash point | ° C. | 45 |
| IP529- 2016 | Freezing point | ° C. | −47.3 |
| ASTM D7345 ASTM D86 | Distillation-IBP | ° C. | 139.0 |
| ASTM D7345 ASTM D86 | Distillation-10% recovery | ° C. | 190.5 |
| ASTM D7345 ASTM D86 | Distillation-50% recovery | ° C. | 265.5 |
| ASTM D7345 ASTM D86 | Distillation-FBP | ° C. | 292.5 |
| ASTM D7345 ASTM D86 | Distillation-residue | vol-% | 1.3 |
| ASTM D7345 ASTM D86 | Distillation-loss | vol-% | 0.5 |
| IP540 | Existent gum | mg/100 ml | 5 |

Considering the light distillate aimed for aviation fuel, the density requirement of at most 772 kg/m$^3$ (measured at 15° C. according to ASTM D4052 2016) was achieved with the performed distillation (density of the renewable paraffinic feed was 779 kg/m$^3$ measured at 15° C. according to ASTM D4052-2016). The freezing point of below −40° C. was achieved.

It will be obvious to a person skilled in the art that, as the technology advances, the inventive concept can be implemented in various ways. The invention and its embodiments are not limited to the examples described above but may vary within the scope of the claims.

The invention claimed is:

1. A method for combined production of renewable paraffinic products, the method comprising:
subjecting a renewable raw material containing fatty acids and/or esters of fatty acids to a hydrodeoxygenation and an isomerization to provide a renewable paraffinic feed; and
fractionating the renewable paraffinic feed into two fractions, such that within the two fractions,
a lighter fraction fulfils a specification for an aviation fuel component of ASTM D7566-17b Annex A2 for HEFA (hydroprocessed esters and fatty acids), and
a heavier fraction fulfils a specification for an electrotechnical fluid component of standard IEC 60296-2018,
a combined yield of the two fractions is at least 98 wt-% of the renewable paraffinic feed subjected to the fractionation, and
a yield of the lighter fraction is 20-90 wt-% of a total weight of the two fractions, and a yield of the heavier fraction is 10-80 wt-% of the total weight of the two fractions.

2. The method according to claim 1, wherein the heavier fraction fulfils a specification for an electrotechnical fluid component of standard IEC 60296-2018 comprising:
a viscosity at 40° C. as measured according to ENISO 3104-1996 of 12 mm$^2$/s or below, typically 3.4mm$^2$/s,
a viscosity at –30°° C. as measured according to ENISO 3104-1996 of 1800 mm$^2$/s or below, typically 42.2 mm$^2$/s,
a flash point (PM) as measured according to ENISO 2719-2016 of at least 135° C., typically 138.5° C., and an acidity of 0.01 mg KOH/g or below, typically less than 0.001 mg KOH/.

3. The method according to claim 1, wherein the heavier fraction is a transformer oil fulfilling all Table 2 General Specifications of standard IEC 60296-2018.

4. The method according to claim 1, wherein the fractionating is provided by distillation.

5. The method according to claim 1, wherein the combined yield of the two fractions is at least 99 wt-% or 100 wt-% of the renewable paraffinic feed subjected to the fractionation.

6. The method according to claim 1, wherein the isomerization is catalytic isomerization, and/or catalytic hydroisomerization.

7. The method according to claim 1, comprising:
adjusting a production capacity of the lighter fraction and the production capacity of the heavier fraction by selection of at least one or more of hydrodeoxygenation and isomerization conditions, temperature and/or residence time in the isomerization, and/or by selection of the renewable raw material.

8. The method according to claim 1, comprising:
performing the hydrodeoxygenation under a hydrogen pressure from 10 to 200 barg (bar gauge), at temperature from 200 to 400° C., and using liquid hourly space velocity of 0.2 h-1 to 10 h-1.

9. The method according to claim 1, comprising:
performing the isomerization at a temperature of 200-500° C., and/or at 280-400°° C., and at a pressure of 10-150 bar (absolute), and/or 30-100 bar.

10. The method according to claim 1, comprising:
subjecting the renewable paraffinic feed, after the hydrodeoxygenation and the isomerization, to a stabilization treatment in a stabilization column, at a pressure lower than the isomerization pressure, to obtain a stabilized renewable paraffinic feed and an overhead fraction containing hydrocarbons in a naphtha range (C4-C8);
followed by subjecting the stabilized renewable paraffinic feed to the fractionation, and optionally recovering and recycling at least part of the overhead fraction back to the stabilization column for refluxing.

11. The method according to claim 1, comprising:
adjusting a production capacity of the lighter fraction and the production capacity of the heavier fraction by selection of a cloud point and/or density of the renewable paraffinic feed.

12. The method according to claim 11,
wherein the cloud point of the renewable paraffinic feed is –30° C. or below, or –34° C. or below, or –40° C. or below, or –48° C. or below, as measured according to EN23015-1994.

13. The method according to claim 1, wherein a yield of the lighter fraction is 70-90 wt-% of the total weight of the two fractions, and a yield of the heavier fraction is 10-30 wt-% of the total weight of the two fractions.

14. The method according to claim 1, wherein the renewable paraffinic feed contains C8-C22 hydrocarbons, or C10-C20 hydrocarbons, or C15-C18 hydrocarbons.

15. The method according to claim 1, wherein the renewable paraffinic feed has a distillation range of within a range of 140° C.-340° C., and/or within the range of 180° C.-320° C.

16. The method according to claim 1, wherein the lighter fraction fulfils a specification for an aviation fuel component of ASTM D7566-17b Annex A2 for HEFA comprising:
a density of at most 772 kg/m$^3$ as measured at 15° C. according to ASTM D4052-2016; and
a freezing point of less than –40° C. as measured according to IP529-2016.

17. The method according to claim 1, wherein the lighter fraction is an aviation fuel component fulfilling all specifications of ASTM D7566-17b Annex A2 for HEFA.

18. The method according to claim 1, comprising:
stabilizing the lighter fraction by admixing one or more antioxidants.

19. The method according to claim 1, comprising:
blending:
1-50 vol-%, and/or 3-50 vol-%, of the lighter fraction;
99-50 vol-%, and/or 97-50 vol-%, of a fossil aviation fuel component;
and optionally one or more aviation fuel performance enhancing additive selected from at least one or more of antioxidants, metal deactivators, and fuel system icing inhibitors, and/or one or more aviation fuel handling and maintenance additive selected from electrical conductivity improvers, leak detection additives, biocidal additives, corrosion inhibitors, and/or lubricity improvers;
to obtain a final aviation fuel composition.

* * * * *